No. 675,014. Patented May 28, 1901.
W. RAEUCHLE.
HALTER.
(Application filed Apr. 16, 1900.)
(No Model.)
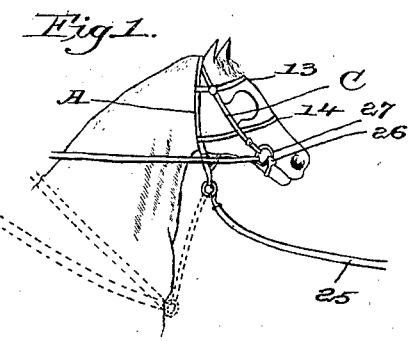
Fig. 1.
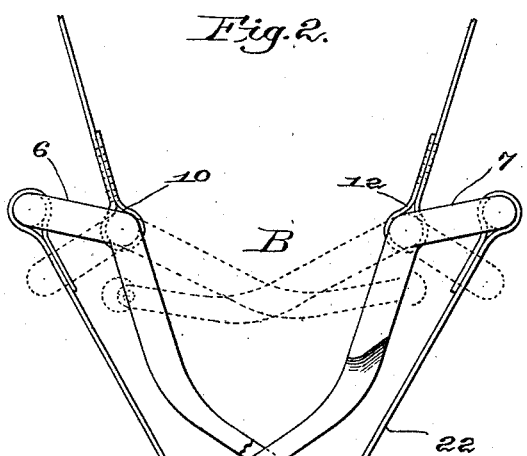
Fig. 2.
Fig. 4.
Fig. 5.
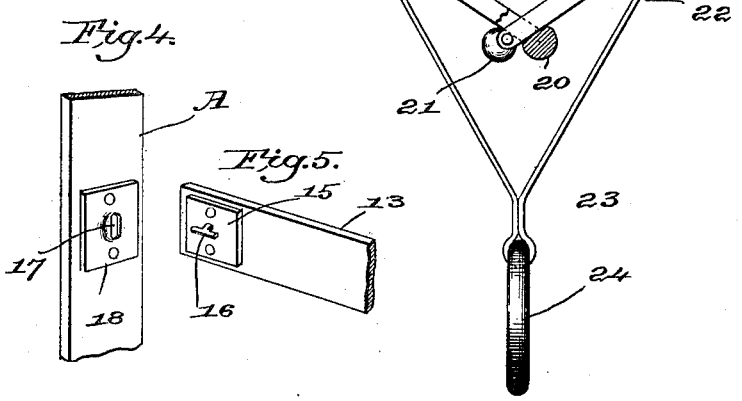
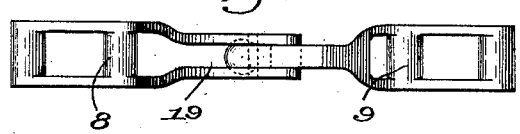
Fig. 3.
Witnesses.
Thomas J. Drummond
N. C. Lunsford
Inventor.
William Raeuchle,
By Crosby Gregory
attys.

UNITED STATES PATENT OFFICE.

WILLIAM RAEUCHLE, OF BOSTON, MASSACHUSETTS.

HALTER.

SPECIFICATION forming part of Letters Patent No. 675,014, dated May 28, 1901.

Application filed April 16, 1900. Serial No. 13,073. (No model.)

*To all whom it may concern:*

Be it known that I, WILLIAM RAEUCHLE, of Boston, county of Suffolk, State of Massachusetts, have invented an Improvement in Halters, of which the following description, in connection with the accompanying drawings, is a specification, like characters on the drawings representing like parts.

This invention relates to halters; and the object of the invention is to provide an improved and simple appliance of this character especially intended for fractious or unruly horses, it having means to be operated by a driver of a horse or by the horse himself when hitched to choke him if he shows any tendency to run away, this being accomplished "by cutting off his wind," in which manner he may be readily controlled.

In the present case the halter has a head-strap and a choking device connected therewith and means to put the choking device into action, and the choking device, as well as the other parts, may be of any suitable kind. The choking device is represented in the drawings as including two crossed levers operated in such manner as to press against the windpipe, so as to choke the horse into submission.

The invention is shown in one simple embodiment thereof in the accompanying drawings, wherein—

Figure 1 is a perspective view of the halter, showing this mode of attachment to a horse. Fig. 2 is a front view of the lower end of the same. Fig. 3 is a plan view of a choking device, and Figs. 4 and 5 are perspective views of portions of two of the straps of the halter and a manner of detachably uniting the same.

The improved halter in the form thereof represented in the accompanying drawings includes in its construction a head-strap, as A, to which a choking device, as B, is connected.

The head-strap is adapted to pass around the neck of the horse near his head, while the choking device connected therewith fits under the throat near the windpipe, but normally is out of contact therewith, as shown by full lines in Fig. 2.

The choking device is shown as consisting of two crossed levers, as 6 and 7, having a sliding connection with each other and having at their outer ends frame or body portions provided with cross-bars, as 8 and 9, constituting the fulcrums thereof, the head-strap or the branches thereof having loops, as 10 and 12, at the lower ends to receive the cross-bars or fulcrums.

The head-strap A is shown as held in place by forehead and nose straps, as 13 and 14, respectively, preferably detachably connected therewith. The forehead-strap has at its ends plates, as 15, provided with T-headed studs, as 16, adapted to enter longitudinal slots, as 17, in plates, as 18, in the adjacent head-strap. (See Figs. 4 and 5.) To connect the parts, the T-headed studs 16 are inserted in the slots 17 and the plates 15, and consequently the strap 13 thereafter given a quarter-turn, which unites the two parts. The strap 14 is likewise connected with the strap A.

The lever 6 is bifurcated, the aperture or slot 19 between the branches of the bifurcation receiving the free portion of the complemental lever, and said levers are held down in their ineffective positions, as indicated in Fig. 2, preferably by weights, as 20 and 21, respectively, shown as spheres rigid upon their free ends, the weight or sphere 21 on the end of lever 7 being larger than the slot 19 and serving to prevent the disengagement of said levers. The upper end of said slot 19 may be enlarged, as shown in Fig. 3, thus furnishing means whereby the weight 21 may be inserted through said slot when the device is being placed upon the horse.

A strap, as 22, is connected with the extreme outer ends of the two levers and depends therefrom, it being doubled on itself near its middle and there stitched to form a loop or eye 23, which receives the ring 24. By drawing down upon the ring 24 the strap 22 serves to simultaneously swing the inner or free portions of the levers up, as indicated by the dotted lines in Fig. 2, in such manner that they can bear against the windpipe and choke the animal.

A halter or hitching strap, as 25, may be connected with the ring 24, and this being tied to a post or to a weight when the horse attempts to break away the halter or strap 25 will be drawn taut, so as to swing the two levers up into position to choke him.

In Fig. 1 I have shown a bridle C, the bit 26 of which has the usual rings 27.

When driving, the halter or hitching strap may be passed through a ring or rings suitably positioned upon the harness or upon a vehicle and passed back to the driver's seat, and if the horse becomes unmanageable a pull can be exerted upon the same to throw the two levers into position to readily control him. I have indicated by dotted lines in Fig. 1 one position the halter or strap 25 would occupy when the horse is being driven.

The invention may be modified within the scope of the accompanying claims.

Having fully described my invention, what I claim, and desire to secure by Letters Patent, is—

1. A halter having a head-strap, crossed levers fulcrumed to the ends of said head-strap, said levers having a sliding connection with each other, and means to operate the levers.

2. A halter having a head-strap, crossed levers fulcrumed intermediate their ends to the ends of said head-strap, said levers having a sliding connection with each other, and means to operate the levers.

3. A halter having a pair of crossed levers, means to suspend said levers under the throat of the horse, said levers having a sliding connection with each other, and means to operate said levers to choke the horse.

4. A halter having a pair of crossed levers, means to pivotally support said levers intermediate their ends under the throat of the horse, said levers having a sliding connection with each other, and means to operate said levers to choke the horse.

5. A halter having a pair of crossed levers, means to suspend said levers under the throat of the horse, one of said levers being apertured to receive the end of the other, said levers having a sliding connection with each other, and means to operate said levers to choke the horse.

6. A halter having a pair of crossed levers, means to suspend said levers under the throat of the horse, said levers having a sliding connection with each other, and being provided with weights to normally hold them ineffective, and means to operate said levers.

7. A halter having a pair of crossed levers, means to suspend said levers under the throat of the horse, one of said levers being apertured to receive the end of the other, and said levers having a sliding connection with each other, and means to prevent said levers from becoming disengaged when in their ineffective position.

In testimony whereof I have signed my name to this specification in the presence of two subscribing witnesses.

WILLIAM RAEUCHLE.

Witnesses:
HEATH SUTHERLAND,
MARGARET A. DUNN.